United States Patent Office 3,086,040
Patented Apr. 16, 1963

3,086,040
1,3,3,5-TETRACHLORO-2-KETO-7-CYANO-[2.2.2]-
BICYCLOOCTENE-5
Homer J. Sims, Philadelphia, Pa., assignor to Rohm &
Haas Company, Philadelphia, Pa., a corporation of
Delaware
No Drawing. Filed Jan. 10, 1962, Ser. No. 165,291
5 Claims. (Cl. 260—464)

This invention deals with a specific bicyclooctene as a new composition of matter. It further deals with a method for the preparation of this specific bicyclooctene.

The compound of the present invention is 1,3,3,5-tetrachloro-2-keto-7-cyano-[2.2.2]-bicyclooctene-5.

The compound of the present invention is prepared by reacting 2,4,6-trichlorophenylhypochlorite with acrylonitrile.

The trichlorophenylhypochlorite reactant may be used as such or it may be prepared in situ in the reaction medium. If the latter embodiment is preferred, one mixes approximately equimolecular amounts of a trichlorophenol and an alkylhypochlorite in the reaction medium. The alkyl group in the hypochlorite may contain from 1 to 18 carbon atoms, preferably 4 to 8 carbon atoms. While the alkyl group may exhibit any of the various isomeric arrangements, the tertiary configuration is preferred. Typical embodiments include t-butyl hypochlorite, hexyl hypochlorite, t-octyl hypochlorite, and dodecyl hypochlorite.

It is frequently preferable to prepare the 2,4,6-trichlorophenylhypochlorite in situ in the reaction medium, as a matter of convenience, and, also, because some of the contemplated hypochlorites tend to be somewhat unstable. For reasons not entirely understood, there is no observable reaction if more or less than four chlorine atoms are present in the chlorinated phenylhypochlorite reactant.

The present process involves a substantially equimolecular reaction between the aforementioned reactants. It is, however, frequently desirable to employ an excess of acrylonitrile. This assures high yields of desired product and also serves as a solvent. If a solvent is desired, other than an excess of acrylonitrile as previously mentioned, there may be employed t-butanol, carbon tetrachloride, ethyl ether, benzene, and the like. The solvent, of course, should be organic, volatile, and inert.

The present reaction is conducted in a temperature range of about 20° to 120° C., preferably 25° to 85° C. The product is a crystalline solid which is isolated by cooling the reaction mixture and filtering or by evaporating the solvent or excess reactant as the case may be. If desired, the product may be recrystallized from ethanol, aqueous ethanol, or other suitable solvent.

The compound of the present invention is useful as a fungicide, particularly when applied against *Stemphylium sarcinaeforme* and *Monilinia fructicola* in usual amounts and according to standard techniques. Concentrations of about 0.1% by weight in a commercial carrier are quite effective in this respect. The present compound also exhibits herbicidal activity particularly against dicotyledonous plants especially in post-emergence applications.

The present compound as well as the method for its preparation may be more fully understood from the following example which is offered by way of illustration and not by way of limitation. Parts by weight are used throughout.

*Example*

There are added to a reaction vessel 19.7 parts of 2,4,6-trichlorophenol dissolved in 120 parts of acrylonitrile. There is then added 11 parts of t-butylhypochlorite over a period of 15 minutes. The reaction mixture is allowed to stand at room temperature for two weeks. The product crystallizes and is filtered. It is then recrystallized from ethanol yielding 8 parts of a crystalline solid having a melting point of 155° to 160° C. The product contains 37.68% carbon (37.93% theoretical); 1.72% hydrogen (1.77% theoretical); 4.86% nitrogen (4.92% theoretical); and 49.95% chlorine (49.77% theoretical). The product is identified as 1,3,3,5-tetrachloro-2-keto-7-cyano-[2.2.2]-bicyclooctene-5.

This application is a continuation-in-part of application Serial Number 57,393, filed September 21, 1960, now abandoned.

I claim:
1. The compound, 1,3,3,5-tetrachloro-2-keto-7-cyano-[2.2.2]-bicyclooctene-5.
2. A method for preparing 1,3,3,5-tetrachloro-2-keto-7-cyano-[2.2.2]-bicyclooctene-5 which comprises reacting in the range of about 20° to 120° C. 2,4,6-trichlorophenylhypochlorite with acrylonitrile.
3. A method according to claim 2 in which the reaction is conducted in a temperature range of about 25° to 85° C.
4. A method according to claim 2 in which the trichlorophenylhypochlorite is prepared in situ from trichlorophenol and an alkylhypochlorite in which the alkyl group contains from 1 to 18 carbon atoms.
5. A method according to claim 2 in which the trichlorophenylhypochlorite is prepared in situ from trichlorophenol and a t-alkylhypochlorite in which the alkyl group contains from 4 to 8 carbon atoms.

No references cited.